(12) United States Patent
Kfoury (10) Patent No.: US 9,475,678 B2
(45) Date of Patent: Oct. 25, 2016

(54) LOAD MANIPULATOR WITH IMPROVED BALANCING

(71) Applicant: Commissariat a l'energie Atomique et aux Energies Alternatives, Paris (FR)

(72) Inventor: Fares Kfoury, Antony (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 63 days.

(21) Appl. No.: 14/351,581

(22) PCT Filed: Oct. 18, 2012

(86) PCT No.: PCT/EP2012/070678
§ 371 (c)(1),
(2) Date: Apr. 14, 2014

(87) PCT Pub. No.: WO2013/057203
PCT Pub. Date: Apr. 25, 2013

(65) Prior Publication Data
US 2014/0248110 A1    Sep. 4, 2014

(30) Foreign Application Priority Data

Oct. 18, 2011  (FR) ...................................... 11 59394

(51) Int. Cl.
*B66C 23/72* (2006.01)
*B25J 9/10* (2006.01)
(Continued)

(52) U.S. Cl.
CPC .............. *B66C 23/72* (2013.01); *B25J 9/1065* (2013.01); *B25J 18/00* (2013.01); *B25J 19/002* (2013.01); *B25J 19/0016* (2013.01); *B66C 23/005* (2013.01); *B66C 23/06* (2013.01)

(58) Field of Classification Search
CPC ....... B25J 9/1065; B66C 23/04; B66C 23/74
See application file for complete search history.

(56) References Cited

U.S. PATENT DOCUMENTS

| 4,215,972 A * | 8/1980 | Yamasaki | B66C 23/005 |
| | | | 212/196 |
| 2003/0192961 A1* | 10/2003 | Tango | A01M 7/0057 |
| | | | 239/146 |

(Continued)

FOREIGN PATENT DOCUMENTS

| FR | 2754527 A1 | 4/1998 |
| FR | 2781709 A1 | 2/2000 |

(Continued)

OTHER PUBLICATIONS

French Search Report issued in Application No. 758279 dated May 9, 2012.

(Continued)

*Primary Examiner* — Gerald McClain
*Assistant Examiner* — Ronald Jarrett
(74) *Attorney, Agent, or Firm* — Pearne & Gordon LLP (57) ABSTRACT

Load manipulator comprising a boom arm (1) and a return arm (3) parallel to each other, a loading bar (2) and a counterbar (4) so as to form a deformable parallelogram, an approximately horizontal pivot axis on which one of the arms of the parallelogram is articulated, and balancing means (8) applying a force at an compensation application point (C) to compensate for the force due to the load, said point being a point on the return arm (3) and a point on the counterbar such that it is always in line with point (M) on the loading bar at which the force due to the load is applied and the rotation axis, in which the balancing means (8) comprise a first counterweight (10) and a second counterweight (12) and a jack to compensate for the value of the force due to the load, the first counterweight (10) and the jack applying a force onto the compensation application point (C) and the second counterweight (12) applying a force on the boom arm (1).

11 Claims, 3 Drawing Sheets

(51) Int. Cl.
    *B25J 19/00*     (2006.01)
    *B66C 23/00*     (2006.01)
    *B25J 18/00*     (2006.01)
    *B66C 23/06*     (2006.01)

(56) References Cited

U.S. PATENT DOCUMENTS

2004/0138524 A1* 7/2004 Ueda ............... A61B 19/26
                                                        600/102
2006/0043042 A1* 3/2006 Kimura ............. B66C 23/74
                                                        212/178

FOREIGN PATENT DOCUMENTS

| GB | 1029890 | 5/1966 |
|----|---------|--------|
| JP | 51-122254 | 10/1976 |
| JP | S54-102887 A | 8/1979 |
| JP | 07-267600 A | 10/1995 |

OTHER PUBLICATIONS

International Search Report issued in Application No. PCT/EP2012/070678 dated Nov. 23, 2012.

Written Opinion issued in Application No. PCT/EP2012/070678 dated Nov. 23, 2012.

Notification of Reason for Refusal issued in Japanese Patent Application No. 2014-536234 dated Aug. 30, 2016.

* cited by examiner

LOAD MANIPULATOR WITH IMPROVED BALANCING

TECHNICAL FIELD AND PRIOR ART

This invention relates to a manipulator to move a load in a balanced state with improved balancing.

A manipulator is an articulated system capable of handling a load within a defined work space. The system is such that it balances the weight of the load so as to enable free gestural handling with several degrees of freedom.

In practice, the mass of the manipulator is of the same order of magnitude as its load capacity. Consequently, it is important to consider balancing of the structure as well as that of the load.

There are manipulators based on the principle of a deformable parallelogram. For example, such a manipulator is disclosed in document FR 2 754 527. This manipulator comprises a boom arm and a return arm mounted parallel to each other and hinged at their ends by a loading bar and by a counterbar and forming a deformable parallelogram, the loading bar having a point of application of a force due the load, at its free end. One of the arms of the parallelogram is articulated on an approximately horizontal pivot axis supported by a frame. It also comprises a compensator to apply a compensating force for a given value of the load. This compensator acts at a point such that it is always in line with the pivot axis and the application point of the force due to the load. This compensator comprises an appropriate counterweight to balance the weight of the apparatus at no load and for example traction means to generate a compensating force when the load is not zero.

Calculations show that the value of the counterweight and its position on the counterbar are calculated only as a function of the geometry and the weight of the parts forming the system. Manufacturing of such a manipulator can be complex, particularly due to dimensional constraints. Once the geometry of the manipulator has been defined, which may for example be imposed by the function and the work space in which it is constrained, the position of the counterweight is imposed and for example may be located several meters from the rotation axis without it being possible to modify it. The counterweight then makes the manipulator very cumbersome and hinders its manipulation.

It would be preferable to be able to adjust the position and the value of the counterweight to take account of manufacturing uncertainties in balancing, however in practice it would be complex to adjust the value.

PRESENTATION OF THE INVENTION

Consequently, one purpose of this invention is to disclose manipulator with a simple design and with a low cost price providing perfect compensation of the weight of the manipulator and the handled load at all points in the work space.

The purpose of this invention is achieved by a manipulator of the deformable parallelogram type comprising a boom arm and a return arm mounted parallel to each other and articulated at their ends by a loading bar and a counterbar and forming a deformable parallelogram, the parallelogram being articulated on a frame about an approximately horizontal axis, means of applying a load compensating force, and means of compensating the weight of the manipulator structure at no load. The compensating means comprise at least two counterweights, a first counterweight the weight of which is applied at an application point in line with the application point of the force due to the load, and the point defined by the intersection of the horizontal axis and the plane containing the deformable parallelogram, regardless of the position of the load, and a second counterweight the weight of which is applied onto the boom arm or the return arm. The means of applying a force compensating the load to be compensated apply their force at the compensation application point.

With the invention and through the use of several counterweights, a degree of freedom is achieved in the calculation of the value and the position of these counterweights. This degree of freedom means that counterweights can be arranged so that the system occupies the least possible space during operation. The structure balancing function and the load balancing function of the manipulator are also separate.

In this application, "means forming counterweights" denote means capable of applying a force to balance the manipulator at no load. This may relate to elements for which the force is generated by their weight. This may also relate to springs fixed to the return arm and the boom arm so as to apply a force capable of balancing the manipulator at no load.

In one particularly advantageous embodiment, the manipulator comprises two additional counterweights one of which is arranged on the counterbar and the other on the return arm, these counterweights having an adjustable position.

These counterweights enable precise balancing of the manipulator at no load, which means that compensation proportional to the weight of the load can be applied, i.e. the function relating the force applied by the load and the compensating force is a linear function. They can also eliminate uncertainties in manufacturing the system.

Furthermore, the positions of counterweights are adjusted sequentially and not coupled to each other. This results in a simple and precise balancing procedure.

The subject-matter of this invention is then a load manipulator comprising a boom arm and a return arm mounted parallel to each other and articulated at their ends by a loading bar and a counterbar so as to form a deformable parallelogram, an approximately horizontal rotation axis on which the boom arm or the return arm is articulated, the rotation axis being supported by a frame, the rotation axis intersecting the boom arm or the return arm and balancing means applying forces including a force to compensate for a given value of the force due to the load at an application point called the compensation application point, said compensation application point being a point on the counterbar and/or the non-articulated arm about the rotation axis such that it is always in line with a point of the loading bar at which the force due to the load is applied and a point on the rotation axis located in the plane of the deformable parallelogram, in which the balancing means comprise a first counterweight and a second counterweight designed to balance the manipulator at no load and means for compensating the value of the force due to the load, the weight of the first counterweight and the force compensating the value of the force due to the load being applied on the compensation application point and the weight of the second counterweight being applied on the arm articulated about the rotation axis.

In one particularly advantageous example, the manipulator comprises a third counterweight and a fourth counterweight, the third counterweight being supported by the return arm not articulated about the rotation axis and the fourth counterweight being supported by the counterbar, the value of the third counterweight and the value and the position of the fourth counterweight being chosen such that the value of the balancing force applied at the compensation application point is a linear function of the force applied by the load on the loading bar and the position of the third counterweight being chosen so as to compensate for the effect of the fourth counterweight on balancing of the manipulator.

Advantageously the third counterweight has an adjustable position along the return arm that supports it and the fourth counterweight also has an adjustable position along the counterbar. In this case, the counterweights are not calculated very precisely (the value of the second counterweight may be a integer multiple of a given mass, for example if identical plates are stacked on each other) and the adjustment of the positions of the third and fourth counterweights can overcome this inaccuracy and manufacturing inaccuracies.

In another embodiment, the counterweights are replaced by spring systems.

For example, the compensation application point is located at the articulation point of the unarticulated arm about the rotation axis and the counterbar and in which the second counterweight is connected to a free end of the articulated arm about the rotation axis opposite the end articulated on the loading bar.

The means of compensating for the value of the force due to the load may for example be composed of traction means. These traction means may consist of a jack with a rod that applies a force at the application point. The first counterweight is then advantageously mounted around the jack rod.

Advantageously, the frame is free to rotate about an approximately vertical axis and/or along at least one horizontal axis. A drive device may be provided to move the frame in rotation about an approximately vertical axis and/or along at least one horizontal axis.

BRIEF DESCRIPTION OF THE DRAWINGS

This invention will be better understood after reading the following description and the appended drawings in which.

DETAILED PRESENTATION OF PARTICULAR EMBODIMENTS

Figure 1:
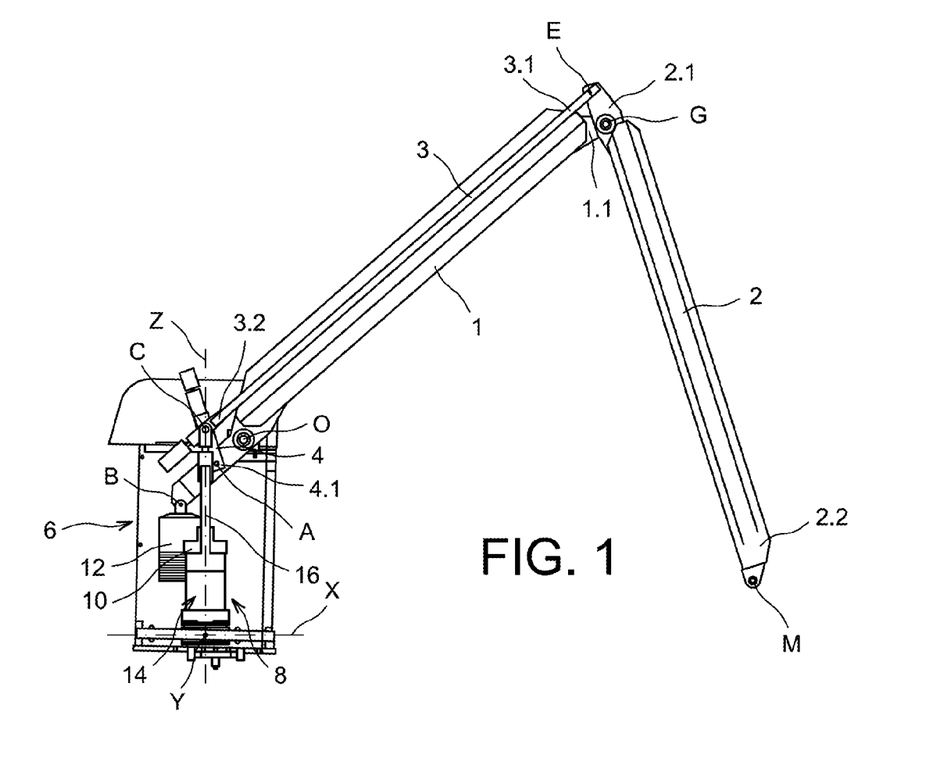
FIG. 1 is a side view of an example embodiment of a manipulator according to this invention.
Figure 2:
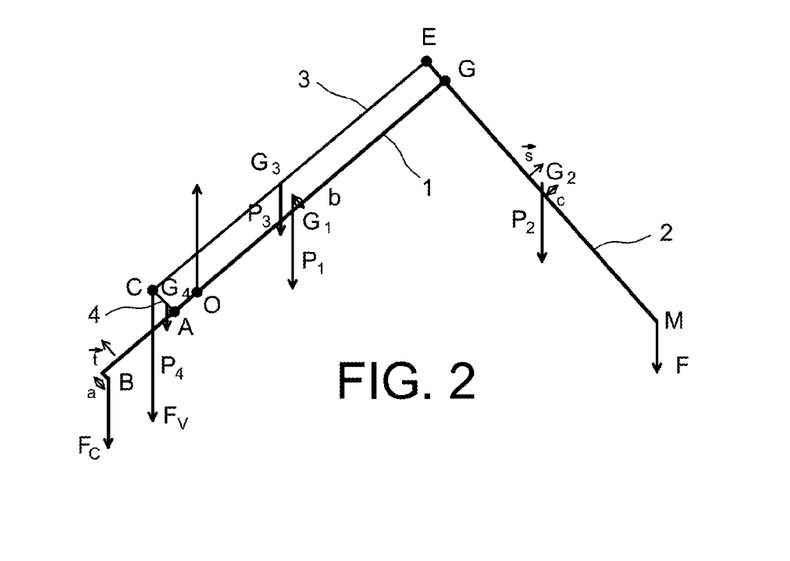
FIG. 2 is a diagram of the manipulator in FIG. 1, on which the forces applied on the different elements of the manipulator are shown.

FIGS. 1 and 2 show an example embodiment of a manipulator according to the invention.

The manipulator comprises a boom arm 1 and a return arm 3 mounted parallel to each other and articulated at their ends by a loading bar 2 and a counterbar 4 and forming a deformable parallelogram. The parallelogram is contained in a plane that will be approximately vertical.

A first end 2.1 of the loading bar 2 is articulated at a point E on a first end 3.1 of the return arm 3. A second end 2.2 of the loading bar 2 forms an application point M of the force applied by the load to be handled.

A first end 1.1 of the boom arm 1 is articulated on the loading bar 2 at a point G located between point E and point M. The boom arm 1 is mounted articulated on a frame 6 about an approximately horizontal axis. The intersection of the horizontal axis and the plane of the parallelogram is denoted O. In the following description, the approximately horizontal rotation axis will also be denoted O.

The counterbar 4 is articulated through a first end 4.1 on the boom arm 1 between point O and a second longitudinal end of the boom arm 1 at a point A, and is articulated on the return arm 3 at the second longitudinal end 3.2 of the return arm 3 at point C.

The second end of the boom arm 1 is denoted by the letter B.

The manipulator also comprises means 8 for performing balancing at no load, i.e. when there is no load suspended at M, and in the presence of a load.

The balancing means 8 comprise a first counterweight 10 articulated on the counterbar and on the return arm at point C, and a second counterweight 12 articulated on the boom arm 1. In the example shown, the second counterweight 12 is articulated at point B.

In the example shown, the counterweights are formed by elements with a mass providing balancing.

Furthermore, the balancing means 8 comprise means of developing a compensating force, i.e., a compensator, adapted to the load. For example, they may be traction means. In the example shown in FIG. 1, a jack 14 is used in which the rod 16 is articulated on the counterbar 4 and on the boom arm 1 at point C. Advantageously, the first counterweight 10 is mounted around the rod 16 of the jack, which simplifies manufacturing of the manipulator, eliminating an articulation specific to the first counterweight at point C. The jack 14 compensates for the effect of the load on the balance of the manipulator.

A manipulator in which the first counterweight 10 is connected to point C separate from the jack is within the scope of this invention. For example, the jack may be a hydraulic or electric type jack and the means providing a compensating force may also be formed by one or more springs.

The compensation application point C could be either on the unarticulated arm on the rotation axis or on the counterbar and not at the articulation, without going outside the scope of this invention.

Figure 5:
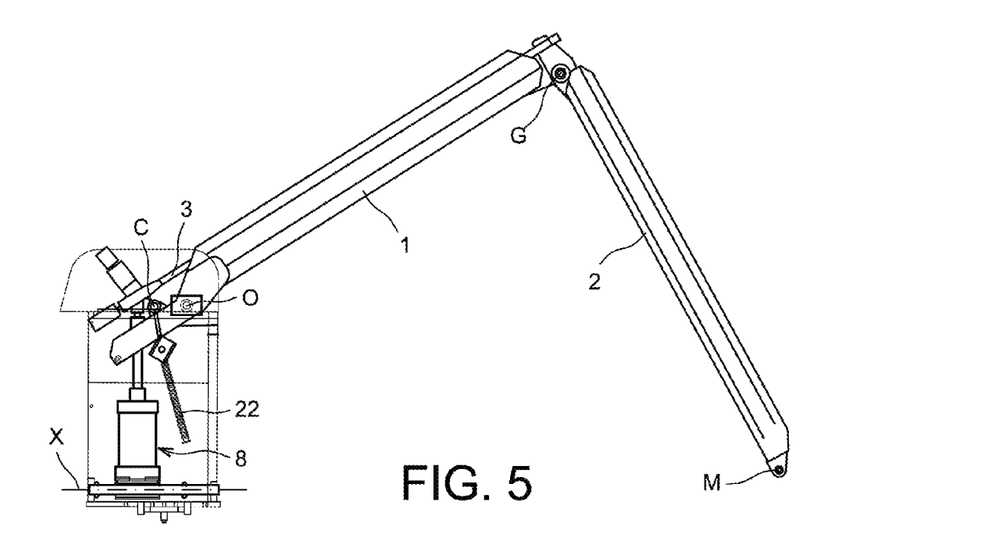
FIGS. 5 and 6 are side views of another example embodiment of a manipulator according to the invention in which one of the counterweights is formed by a spring.
Figure 6:
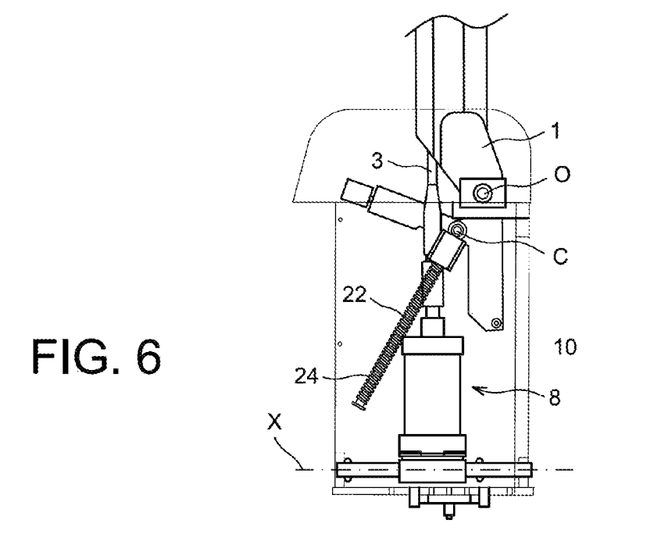

According to another example, the counterweights could be formed wholly or partly by spring systems to perform the same balancing functions. FIGS. 5 and 6 show an example of an embodiment of a manipulator according to the invention in which the second counterweight 12 is formed by a spring 22 that applies a force on the boom arm 1. The spring 22 is mounted around a rod 24 articulated on the boom arm 1. The spring bears between one end of the rod 24 and one part (not visible) forming a stop, articulated in rotation on the manipulator frame. The rod 24 passes through the part forming the stop, this part then follows the movement of the rod 24. Advantageously, the position of the rotation axis of the part forming the stop is adjustable, which allows an adjustment to overcome the uncertainty about the stiffness of the spring. In the example shown, the part forming the stop is articulated in rotation on elements 28 mounted on the frame, the position of which can be adjusted to modify the position of the rotation axis of the part forming the stop.

The first counterweight 10 is formed by a mass, the weight of which is applied on the return arm 3. As a variant, it would also be possible for the first counterweight to be formed by a spring, or the first counterweight could be formed by a spring and the second counterweight by a mass.

In the example shown in FIG. 1, the frame is mounted free to pivot about a vertical axis Z on the ground and is capable of sliding along two horizontal axes X and Y perpendicular to each other. The parallelogram then deforms in a plane that can pivot about the Z axis. These articulations about the Z axis and along the X and Y horizontal axes do not affect balancing of the manipulator.

Advantageously, a drive device is used for displacement of the frame in rotation and/or translation.

In the example shown, the frame 6 is supported on the ground, the deformable parallelogram being arranged above the frame. A manipulator for which the frame is for example suspended from a ceiling, the deformable parallelogram being located below the frame, is not outside the scope of this invention.

In FIG. 2, the centres of gravity of each of the elements 1, 2, 3, 4 of the manipulator are denoted $G_1$, $G_2$, $G_3$, $G_4$ respectively.

$\vec{F}$ is the force applied by the load at point M, $\vec{F_V}$ is the force applied by load balancing means at point C, and $\vec{F_C}$ is the force applied by the second counterweight at point B.

The weight of each element 1, 2, 3, 4 is denoted by vectors $\vec{P_1}$, $\vec{P_2}$, $\vec{P_3}$, $\vec{P_4}$ respectively.

In the example shown, point B is not on the axis of the boom arm, and points $G_1$ and $G_2$ are at distances from this axis equal to a, b, c respectively.

Vectors $\vec{t}$ and $\vec{s}$ denote vectors of module 1 perpendicular to the boom arm 1 and the loading bar 2 respectively.

$\vec{R_B}$ denotes the reaction of the frame at the horizontal axis at point O.

When the balance equations of the forces and moments are written for each of the elements 1, 2, 3, 4, the following equations are obtained:

$$\begin{cases} \vec{R_b} + \vec{F_c} + \vec{P_1} + \vec{F_{21}} + \vec{F_{41}} = \vec{0} \\ \vec{OB} \wedge \vec{F_c} + \vec{OG_1'} \wedge \vec{P_1} + \vec{OG} \wedge \vec{F_{21}} + \vec{OA} \wedge \vec{F_{41}} = \vec{0} \end{cases}$$

$$\begin{cases} \vec{P_2} + \vec{F_{32}} - \vec{F_{21}} + \vec{F} = \vec{0} \, (\vec{F_{12}} = -\vec{F_{21}}) \\ \vec{GG_2} \wedge \vec{P_2} + \vec{GE} \wedge \vec{F_{32}} + \vec{GM} \wedge \vec{F} = \vec{0} \end{cases}$$

$$\begin{cases} \vec{P_3} + \vec{F_{43}} - \vec{F_{32}} + \vec{F_v} = \vec{0} \, (\vec{F_{23}} = -\vec{F_{32}}) \\ \vec{EG_3} \wedge \vec{P_3} + \vec{EC} \wedge (\vec{F_v} + \vec{F_{43}}) = \vec{0} \end{cases}$$

$$\begin{cases} \vec{P_4} - \vec{F_{43}} - \vec{F_{41}} = \vec{0} \\ \vec{AG_4} \wedge \vec{P_4} - \vec{AC} \wedge \vec{F_{43}} = \vec{0} \end{cases}$$

The balance of moments applied at the boom arm is written with points with B' and $G_1'$, which are the projections of B and G1 respectively on (OG):

$$\vec{OG} \wedge \left\{ -\frac{OB'}{OG} \cdot \vec{F_c} + \frac{OG'}{OG} \cdot \vec{P_1} + \vec{P_2} + \frac{EC - EG_3}{EC} \cdot \vec{P_3} + \vec{F} - \frac{OA}{OG} \cdot \left( \vec{P_4} - \frac{EC - EG_3}{EC} \cdot \vec{P_3} + \vec{F_v} + \vec{P_3} \right) \right\} + \vec{t} \wedge \left( -a \cdot \vec{F_c} + b \cdot \vec{P_1} \right) = \vec{0} \quad \text{(I)}$$

This equation must be verified at all positions (regardless of $\vec{OG}$ and $\vec{t}$) to obtain:

$$\vec{F_c} + \frac{OA}{OB'} \cdot \vec{F_v} = \frac{OG_1'}{OB'} \cdot \vec{P_1} + \frac{OG}{OB'} \cdot \vec{P_2} + \frac{OG - EG_3}{OB'} \cdot \vec{P_3} - \frac{OA}{OB'} \cdot \vec{P_4} + \frac{OG}{OB'} \cdot \vec{F} \quad \text{(II)}$$

$$a \cdot \vec{F_c} = b \cdot \vec{P_1} \quad \text{(III)}$$

The balance of moments applied at the loading bar is written:

$$\vec{GG_2} \wedge \vec{P_2} + \vec{GE} \wedge \vec{F_{32}} + \vec{GM} \wedge \vec{F} = \vec{0} \quad \text{(IV)}$$

Also, $$\vec{GE} \wedge \vec{F_{32}} = \vec{AG_4} \wedge \vec{P_4} + \vec{GE} \wedge (\vec{F_v} + \vec{P_3}) \quad \text{(V)}$$
$$= \frac{AG_4}{GE} \cdot \vec{GE} \wedge \vec{P_4} + \vec{GE} \wedge (\vec{F_v} + \vec{P_3})$$

Now, $$\vec{GG_2} = -\frac{GG_2}{GE} \cdot \vec{GE} + c\vec{s} \quad \text{(VI)}$$

et $$\vec{GM} = -\frac{GM}{GE} \cdot \vec{GE} \quad \text{(VII)}$$

Therefore, using equations (IV), (V), (VI) and (VII), we obtain:

$$\vec{GE} \wedge \left\{ -\frac{GG_2}{GE} \cdot \vec{P_2} + \frac{AG_4}{GE} \cdot \vec{P_4} + \vec{F_v} + \vec{P_3} - \frac{GM}{GE} \cdot \vec{F} \right\} + \vec{s} \wedge c \cdot \vec{P_2} = \vec{0}$$

This equation must be satisfied at all positions, therefore regardless of the direction of vector $\vec{GE}$, which implies that the vector between curly brackets is null.

The term $\vec{s} \wedge c \cdot \vec{P_2}$ cannot be compensated. Nevertheless, if we assume that $$\frac{c}{GE} < 10^{-2},$$

the effect of this unbalance is unimportant because the resulting couple is masked by friction of the rotation axis, preloaded by the weight of the articulated parts.

Consequently, $\vec{F_V}$ and $\vec{F_C}$ satisfy the following equations:

$$\begin{cases} \vec{F_c} + \frac{OA}{OB'} \cdot \vec{F_v} = \frac{OG_1'}{OB'} \cdot \vec{P_1} + \frac{OG}{OB'} \cdot \vec{P_2} + \quad \text{(VIII)} \\ \qquad \frac{OG - EG_3}{OB'} \cdot \vec{P_3} - \frac{OA}{OB'} \cdot \vec{P_4} + \frac{OG}{OB'} \cdot \vec{F} \\ \vec{F_v} = \underbrace{\frac{GM}{GE} \cdot \vec{F} + \frac{GG_2}{GE} \cdot \vec{P_2} - \vec{P_3} - \frac{AG_4}{GE} \cdot \vec{P_4}}_{CST} \quad \text{(IX)} \end{cases}$$

Provided that $$\frac{OG}{OA} = \frac{GM}{GE},$$

a single solution ($\vec{F_V}, \vec{F_C}$) to the system of equations VIII-IX is obtained.

The compensating force $F_V$ depends on the load F, and the value of the load $F_C$ is a constant. This equality of the ratio geometrically represents the alignment of the compensation application point, the rotation axis and the load application point.

This condition for equality of dimension ratios is not very restrictive for manufacturing the system because it only involves the boom arm 1 and the loading bar 2, and does not make the manipulator any larger and/or complex to make.

If the compensation application point C is located on the loading bar or on the counterbar and not at the articulation, the same type of equalities are obtained on the lengths reflecting the alignment of the compensation application point, the rotation axis and the load application point.

We then obtain:

$$\begin{cases} \vec{F_c} = \frac{OG'_1}{OB'} \cdot \vec{P_1} + \frac{OG}{OB'} \cdot \frac{G_2M}{GM} \cdot \vec{P_2} + \\ \quad \frac{OG - EG_3}{OB'} \cdot \vec{P_3} + \frac{OA}{GE} \cdot \frac{AG_4 - AC}{OB'} \cdot \vec{P_4} \\ \vec{F_v} = \frac{GM}{GE} \cdot \vec{F} + \underbrace{\frac{GG_2}{GE} \cdot \vec{P_2} - \vec{P_3} - \frac{AG_4}{GE} \cdot \vec{P_4}}_{CST} \end{cases} \quad \text{(X)}$$
$$\quad \text{(XI)}$$

Also, from equation (III), we obtain:

$$a = b \cdot \frac{P_1}{F_c}$$

The value of a can then be determined, for example by measuring parameter b from CAD.

If GG1 is located on segment OG such that b is zero, a is zero and point B is in line with points A, O and G.

The value of the first counterweight is given by the modulus of the vector denoted CST (equation XI), and the value of the second counterweight is given by the modulus of $\vec{F_c}$ (equation X). With the invention, the manipulator is balanced more simply with relatively non-restrictive conditions for manufacturing the manipulator. It is then easy to make a balanced manipulator taking account of dimensional constraints.

Figure 3:
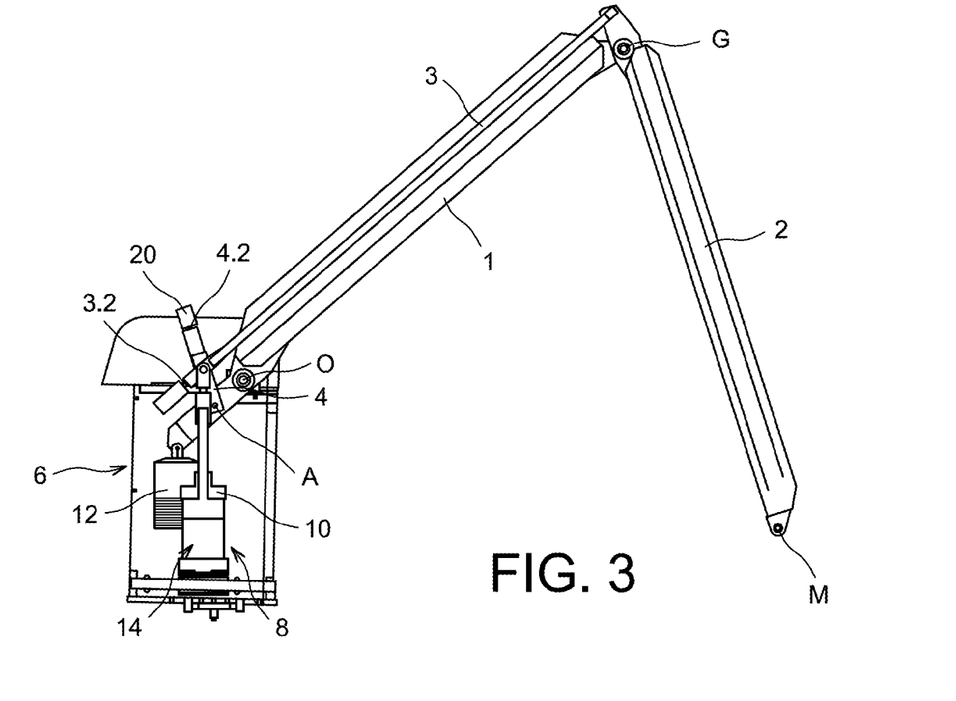
FIG. 3 is a side view of another example embodiment of a manipulator according to this invention.
Figure 4:
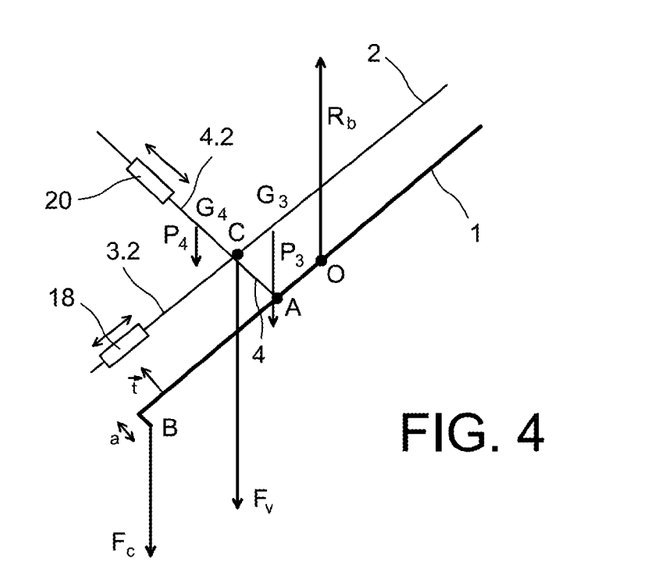
FIG. 4 is a partial diagram of the manipulator in FIG. 3, on which the forces applied on the different elements of the manipulator are shown.

FIGS. 3 and 4 show another particularly advantageous example embodiment of a manipulator according to this invention.

Apart from the first counterweight 10 and the second counterweight 12, the manipulator also comprises a third counterweight 18 and a fourth counterweight 20.

The third counterweight 18 is mounted on the second end 3.2 of the return arm 3 and the fourth counterweight 20 is mounted on the second end 4.2 of the counterbar 4. Each of the third and fourth counterweights has an adjustable position along the axis of the return arm and the counterbar respectively. For example, the third and fourth counterweights are mounted on threads along the return arm 3 and the counterbar 4 respectively, facilitating position adjustments. Any other position adjustment means can be envisaged, for example a rack and pinion.

The value of the third counterweight 18 and the value and position of the fourth counterweight 20 are chosen so as to cancel out the CST term in equation XI. Thus, a linear function rather than an affine function is obtained between the value of $F_V$ and the value of F. The value of $F_V$ is then directly proportional to F. Several families of choices are possible for these three parameters, and this degree of freedom can help to reduce the size of the counterweights.

However, the addition of the third and fourth counterweights has the effect of modifying the value of $F_C$ and consequently the value of the second counterweight 20. But the value of the second counterweight is already defined. Therefore the position of the third counterweight can be chosen, thus compensating for the addition of the fourth counterweight in equation X.

We will now describe an example of a method of adjusting the position of the third and fourth counterweights.

After assembling the different parts of the manipulator, the boom arm 1 is fixed in the vertical position, i.e. segment [BG$_1$] is positioned vertically in line with the rotation axis. The fourth counterweight 20 is then moved along axis AC to balance the loading bar 2.

The boom arm 1 is then released and the third counterweight 18 is moved along the straight line (EC). This does not affect the first balancing that was made, because this balancing depends on the value of $\vec{P_3}$, but does not depend on the position of G$_3$.

In the examples shown, the first counterweight 10 applies its weight on the return arm 3 and the second counterweight 12 applies its weight on the boom arm 1. However, this configuration is in no way limitative. The opposite configuration could be used in which the return arm 3 is articulated about point O.

The result is a load manipulator with improved balancing, while remaining easy to make.

What is claimed is:

1. Load manipulator comprising:
   a boom arm and a return arm mounted parallel to each other and hinged at their ends by a loading bar and by a counterbar so as to form a deformable parallelogram,
   an approximately horizontal rotation axis on which the boom arm or the return arm is articulated, the rotation axis being supported by a frame, the rotation axis intersecting the boom arm or the return arm, the rotation axis not being free to translate relative to the frame during operation,
   and a balancing device applying forces including a force to compensate for a given value of the force due to the load, at an application point called the compensation application point, said compensation application point being a point on at least one of the counterbar and the arm among the boom arm and the return arm which is not articulated about the rotation axis such that it is always in line with a point of the loading bar at which the force due to the load is applied and a point on the rotation axis located in the plane of the deformable parallelogram, in which the balancing device comprises a first counterweight and a second counterweight designed to balance the manipulator at no load and a compensator for compensating the value of the force due to the load, the weight of the first counterweight and the force to compensate the given value of the force due to the load being applied on the compensation application point and the weight of the second counterweight being applied on the arm which is articulated about the rotation axis.

2. Manipulator according to claim 1, comprising a third counterweight and a fourth counterweight, the third counterweight being supported by the return arm which is not articulated about the rotation axis and the fourth counterweight being supported by the counterbar, the value of the third counterweight and the value and the position of the fourth counterweight being chosen such that the value of the balancing force applied at the compensation application point is a linear function of the force applied by the load on the loading bar and the position of the third counterweight being chosen so as to compensate for the effect of the fourth counterweight on balancing of the manipulator at no load, the third counterweight having an adjustable position along the return arm that supports it and the fourth counterweight having an adjustable position along the counterbar.

3. Manipulator according to claim 1, in which all or part of the counterweights are formed by elements with a mass providing balancing.

4. Manipulator according to claim 1, in which all or part of the counterweights are formed by spring systems.

5. Manipulator according to claim 1, in which the compensation application point is located at an articulation point of the arm which is not articulated about the rotation axis and the counterbar and in which the second counterweight is connected to a free end of the arm which is articulated about the rotation axis opposite the end articulated on the loading bar.

6. Manipulator according to claim 1, in which the compensator comprises a traction device developing a compensating force adapted to the value of the load.

7. Manipulator according to claim 6, in which the traction device comprises a jack with a rod that applies a force at the compensation application point.

8. Manipulator according to claim 7, in which the first counterweight is mounted around the rod of the jack.

9. Manipulator according to claim 1, in which the frame is free to move in at least one of the following directions: rotate about an approximately vertical axis and translate along at least one horizontal axis.

10. Manipulator according to claim 9, comprising a drive device to rotate the frame about the approximately vertical axis and/or along at least one horizontal axis.

11. Manipulator according to claim 1, in which only one of the boom arm and the return arm is directly mounted on the frame.

* * * * *

UNITED STATES PATENT AND TRADEMARK OFFICE
CERTIFICATE OF CORRECTION

PATENT NO. : 9,475,678 B2  Page 1 of 1
APPLICATION NO. : 14/351581
DATED : October 25, 2016
INVENTOR(S) : Kfoury It is certified that error appears in the above-identified patent and that said Letters Patent is hereby corrected as shown below:

In the Specification

Column 5, Line 62: please delete "*OG'*" and replace it with --  --

Column 7, Line 28: please delete "OG" and replace it with -- EC --

Signed and Sealed this
Fourteenth Day of February, 2017

Michelle K. Lee
*Director of the United States Patent and Trademark Office*